W. SELLERS.

Toy-Propellers.

No. 5,762. Reissued Feb. 10, 1874.

Witnesses.

Chas Raetty.
F. v. Briesen

Inventor.

Wm. Sellers
per
A. v. Briesen
his attorney.

AM. PHOTO-LITHOGRAPHIC Co. N.Y. (OSBORNE'S PROCESS)

UNITED STATES PATENT OFFICE.

WILLIAM SELLERS, OF NEW YORK, N. Y.

IMPROVEMENT IN TOY PROPELLERS.

Specification forming part of Letters Patent No. 135,851, dated February 11, 1873; reissue No. 5,762, dated February 10, 1874; application filed January 21, 1874.

*To all whom it may concern:*

Figure 1:
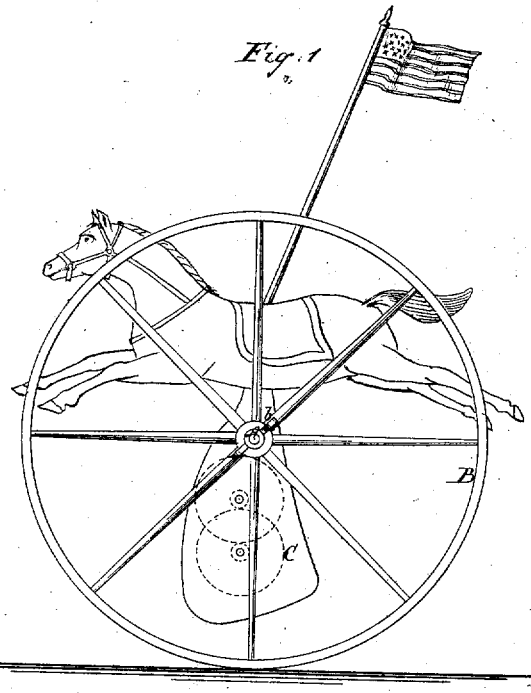
Figure 3:
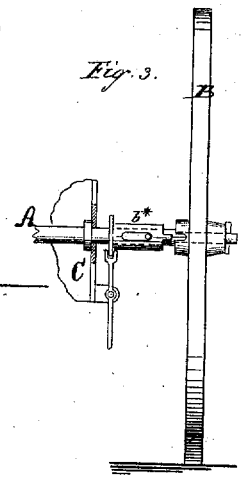
Figure 2:
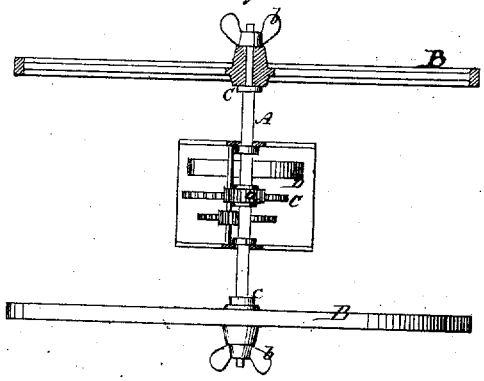

Be it known that I, WILLIAM SELLERS, of New York, in the county and State of New York, have invented a new and Improved Toy-Propeller, of which the following is a specification:

Figure 1 represents a side view of my invention. Fig. 2 is a plan or top view of the same, partly in section. Fig. 3 is a partial horizontal section of a modification of the same.

Similar letters of reference indicate corresponding parts in all the figures.

This invention relates to a toy propeller, the driving power of which is secured to an axle carrying two wheels of equal diameter, either or both of which are provided with a fastening device, whereby the same can be readily locked to the axle in such a manner that, if both wheels are locked to the axle, the toy runs in a rectilinear direction, but if either one or the other of the wheels is loosened, the toy runs on a curved or circular path; and by this variation in the motion of the toy an additional interest is imparted to the same in the eyes of a child.

In the drawing, the letter A designates an axle carrying two wheels, B B, of equal diameter. With this axle is connected a frame, C, which contains a clock-movement, D. The clock-movement is geared together with the axle A by means of a pinion, *a*, which is firmly mounted on said axle, so that, if the clock-movement is wound up, a revolving motion will be imparted to the axle. The wheels B B are so applied to the axle that either or both of them can be fastened by any suitable fastening device. This fastening device may either consist of a simple nut, *b*, (see Figs. 1 and 2,) which screws on the end of the axle, and in this case the axle is provided with a collar, *c*, situated inside of the wheel to be fastened, so that, by screwing up the nut, the hub of the wheel will be firmly clamped between the collar on one side and the nut on its opposite side; or, instead of the nut *b* any other suitable fastening device may be employed, such, for instance, as that shown in Fig. 3. This device consists of a clutch, *b**, which slides on the axle and engages with notches in the hub of the wheel. A suitable lever serves to ship and unship the clutch. The clutch is by preference placed inside the wheel, and a pin, which passes through the outer end of the axle, prevents the wheel from running off.

It will be readily seen that other fastening devices might be suggested which could be used for readily fastening or releasing either or both of the wheels, and I do not wish to be confined to either of the above-described devices, but I reserve the right to substitute therefor any fastening device which may serve my purpose.

The object of this fastening device is to change the course in which the toy will run, at will. If both wheels are fastened on the axle the toy will run in a straight line. If either of the wheels are loosened and the other fastened the toy will run on a curved or circular path. If desired, one or more wheels, mounted on a different axle, may be connected to the axle A. On the axle A may be secured the figure of a horse, or any other desirable figure or device to improve the appearance of the toy.

What I claim as my invention is—

A toy propeller, the driving power of which is secured to an axle carrying two wheels of equal diameter, either or both of which is provided with a fastening device that will serve to fasten the same to the axle or to release it therefrom, substantially in the manner and for the purpose herein shown and described.

WILLIAM SELLERS.

Witnesses:

F. V. BRIESEN,

A. V. BRIESEN.